United States Patent [19]

De Raymond

[11] Patent Number: 4,678,208

[45] Date of Patent: Jul. 7, 1987

[54] GASKET FOR SEGMENTED PIPE COUPLINGS

[75] Inventor: Peter G. De Raymond, Nazareth, Pa.

[73] Assignee: Victaulic Company of America, Easton, Pa.

[21] Appl. No.: 916,277

[22] Filed: Oct. 7, 1986

[51] Int. Cl.$^4$ .............................................. F16L 21/06
[52] U.S. Cl. ...................................... 285/112; 285/373
[58] Field of Search ................ 285/112, 373, 349, 350

[56] References Cited

U.S. PATENT DOCUMENTS

| | | | |
|---|---|---|---|
| 2,913,262 | 11/1959 | De Cenzo et al. | 285/373 X |
| 3,664,691 | 5/1972 | Nakamura | 285/112 |
| 4,391,458 | 7/1983 | Blakeley | 285/112 |

FOREIGN PATENT DOCUMENTS 740433 11/1955 United Kingdom ................ 285/373

Primary Examiner—Thomas F. Callaghan
Attorney, Agent, or Firm—Abelman Frayne Rezac & Schwab

[57] ABSTRACT

An elastomeric gasket for a segmented pipe coupling has ends which extend beyond the ends of the coupling segment, and which are retractable into skirt portions of the gasket formed at the respective ends thereof, the compressive force exerted on the end faces of the gasket being derived from the spring force stored in the gasket material when under compression and being substantially constant without regard to oversizing or undersizing of the pipes to be sealed.

8 Claims, 6 Drawing Figures

U.S. Patent Jul. 7, 1987 Sheet 1 of 2 4,678,208
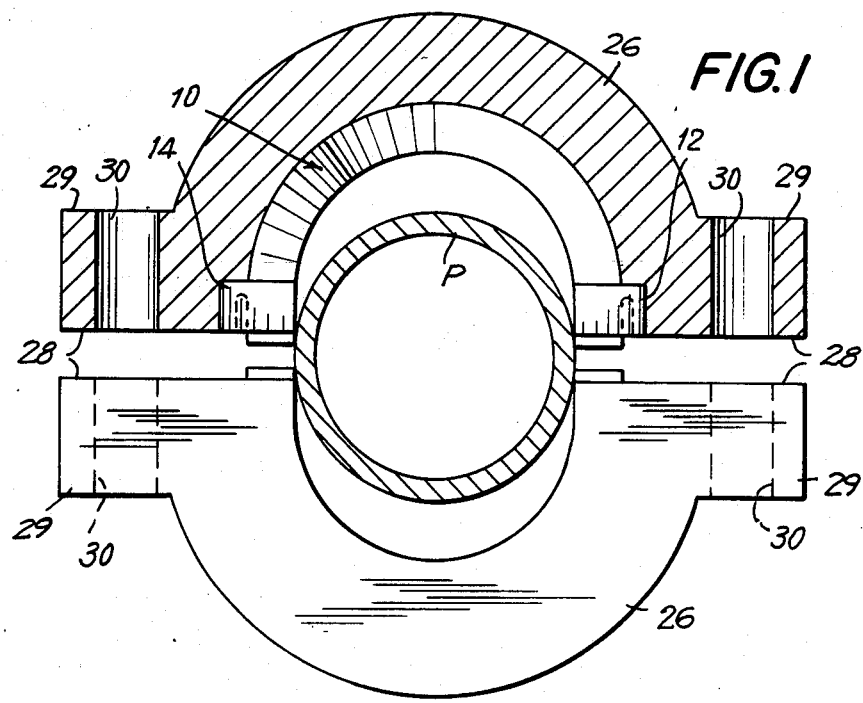
FIG. 1
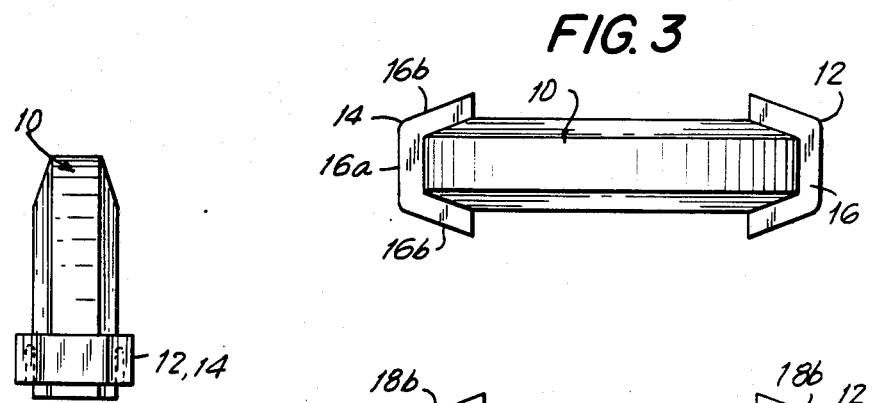
FIG. 2
FIG. 3
FIG. 4

GASKET FOR SEGMENTED PIPE COUPLINGS

FIELD OF THE INVENTION

This invention relates to gaskets formed from an elastomeric material, and which are to be incorporated into pipe couplings having dual or multiple coupling segments.

BACKGROUND OF THE INVENTION

Segmented pipe couplings are well-known in the art, and are comprised of two or more arcuate coupling segments which are assembled in end-to-end encircling relationship with the ends of pipes or fittings which have been positioned in end-to-end relationship and substantially in axial alignment.

The coupling segments are secured to each other at their adjacent ends by track bolts extending through bolting pads at the ends of the coupling segments, or, by any other convenient means. On tightening down of the track bolts the coupling segments are drawn radially inwardly of the axis of the pipes, for the coupling segments either to come into clamping engagement with the external peripheries of the pipes, or, for keys on the inner peripheries of the coupling segments to be moved into engagement with formations on the pipes, such as grooves in the pipes, or, radial excrescences formed or provided exteriorly thereof.

A requirement of such pipe couplings is that they be provided interiorly with a sealing gasket, in order to prevent leakage from the pipes at the adjacent end thereof, and axially past the coupling segments, or, radially between the bolting faces thereof.

Such gaskets commonly are in the form of split gaskets, such that they can be placed over the pipe peripheries, as opposed to being forced axially thereof, and commonly are formed for them to be positioned within and be held captive by the respective coupling segments prior to the assembly of the coupling.

On assembly of the coupling, the ends of the gasket segments are brought into compressive engagement with the ends of adjacent gasket segments, and, into compressive engagement with the pipe peripheries, this occurring during tightening down of the coupling segments.

As a result of tightening down of the coupling segments, compressive hoop stresses are produced in the gasket segments, which cause the respective gasket segments to retract circumferentially into the coupling segments, this acting to equalize the compressive hoop stress throughout the circumferential extent of the gasket segment.

While this equalization of the compressive hoop stress is of assistance in providing uniform compressive sealing engagement of the gasket segment with the pipe peripheries, it also has the disadvantageous result of a reduction in the compressive stress exerted at the end faces of the gasket segment on the end faces of the next adjacent gasket segment.

Thus, as the end faces of the respective gasket segments are located intermediate the bolting faces of the adjacent coupling segments, a loss in compressive sealing engagement can occur at that location, which is exactly that location at which the compressive stresses optimally should be at the possible maximum in order to prevent leakage at that location and radially outwardly between the bolting faces of the adjacent coupling segments.

This problem is further exacerbated in the event that the coupling is of the "rigid" type, which clamps directly onto the pipe peripheries. In this situation, any deviation of the pipe diameter from its standard size, such as invariably occurs due to manufacturing tolerances, can result either in pinching of the gasket material in the event that the pipe is undersized, or, and more importantly, a substantial loss in compressive sealing force exerted between the adjacent end faces of the gasket segments in the event that the pipes are oversized, and, consequential leakage at that location.

This problem is further exacerbated in the event that one of the pipes is oversized and the other is undersized, in that both of the conditions discussed above can occur in combination with each other.

A partial solution to this problem is taught in Blakeley, U.S. Pat. No. 4,391,458 issued July 5, 1983, which teaches the formation of the ends of gasket segments with radially outwardly extending thickened portions which engage behind internal shoulders on his coupling segments. Blakeley's approach is, however, only partially successful in dealing with conditions arising from oversizing of the pipes or the undersizing thereof, or, a combination of both such conditions in a single pipe joint.

Recognizing this problem, Blakeley resorts to the off-setting of the ends of the gasket segments relative to the bolting faces of his coupling segments, such that the plane of the abutting ends of his gasket segments is displaced angularly with respect to the plane of the bolting faces of his coupling segments. This, however, of essence requires an asymmetrical configuration of the gasket segments, with a likelihood that a workman will insert a gasket segment into the coupling segment in a reversed position, this resulting in over-compression of the gasket segments at one end thereof, and, zero compression and possible actual spacing of the gasket ends at the opposite ends thereof.

SUMMARY OF THE INVENTION

According to the present invention, a symmetrical configuration of gasket segment is provided, thus eliminating the possiblity of incorrect assembly of the gasket segment into the coupling segment, and, one in which a predictable compressive force is provided at the abutting end faces of the gasket segments, without regard to over-sizing or under-sizing of the respective pipes.

This is accomplished by forming each end of the gasket segment with a radially and axially extending flange portion adjacent the respective end faces thereof, which provides a reaction member for cooperation with an internal abutment shoulder provided on the associated coupling segment. This confines the compressive stresses exerted on the end faces of the gasket segments to the ends thereof, and precludes dissipation of those stresses within the remainder of the gasket segments.

During tightening down of the coupling segments, the engagement of the gasket segments with the pipes will result in a radially outward force acting on the gasket segments which ordinarily would result in retraction of the ends of the coupling segments due to the gasket segments being expanded to a larger diameter.

This is precluded by the engagement of the respective flange portions with the respective abutment shoulders of the coupling segments, resulting in the portions of the gasket segments intermediate the flange portions being placed under a tensile hoop stress.

In the absence of the flange portions, this tensile hoop stress would be dissipated by inward circumferential movement of the ends of the gasket segments into the coupling segments, and, result in a reduction in the compressive forces exerted at the abutting ends of the gasket segments. This, however, is precluded by the reaction members provided by the flange portions, which act to maintain the intermediate portions of the gasket segments in tension, and, simultaneously isolate the ends of the gasket segments from that tensile force.

This results in a maximum compressive force developed at the ends of the gasket segments, which provides maximum sealing capability at the end faces of the gasket segments, and which is substantially independent of losses arising from expansion of the associated pipes.

The flange portions each merge into a circumferentially extending skirt portion surrounding the adjacent end of the gasket segment, and which is spaced therefrom by an open channel extending around the gasket segment, the gasket segment intentionally being formed over-length in the circumferential direction.

In use, and without regard to over-sizing or under-sizing of the pipes, the ends of the gasket segment will come into abutting contact with the ends of the next adjacent gasket segment prior to the full tightening down of the coupling segments.

At this point, a compressive stress will develop in the ends of the gasket segments, that compressive stress being restricted to the respective ends of the gasket segment by virtue of the engagement of the respective radial flange portions of the gasket segments with the corresponding internal abutment shoulders of the associated coupling segment.

During further tightening down of the coupling segments, and as the material forming the gasket segments is of essence incompressable, the compressive loading at the ends of the gasket segments will result in the ends of the gasket segments retracting into the skirt portions, and will result in radial and axial outward bulging displacement of the ends of the gasket segment relative to the axis of the coupling. This in turn will act to develop a compressive stress at the interface of the abutting end faces of the gasket segments, which is produced by the spring force energy stored in the elastomeric material itself, and which is independent of the forces exerted on the coupling segments.

The compressive stress so produced thus will remain substantially constant until such time as the outwardly displaced body of the gasket segment contacts the internal face of the skirt and completely fills the surrounding channel.

Thus, and without regard to oversizing or undersizing of the pipes, an entirely predictable compressive force is produced at the abutting ends of the gasket segments, which effectively is independent of the compressive force exerted by the coupling segments, and which is derived exclusively from the spring force energy stored in the material comprising the end portions of the gasket segments.

In order for the gasket to seal, three criteria must be met. First, the gasket must contact the pipe periphery with sufficient sealing force. Next, the ends of the gasket must abut with sufficient sealing force. Lastly, the ends of the gasket must mate perfectly to close any potential leak paths. Nearly any standard split gasket satifies the first two requirements. The gasket of the present invention satifies all three requirements.

The gasket has circumferentially extending ends. It also has an inner periphery of smaller diameter then the outer periphery of the pipe. This results in the ends of the gasket being deflected outwardly during assembly, even before the gasket ends abut with the adjacent gasket ends. The space between the gasket and the skirt allows the end of the gasket to flex outwardly. If the space is not provided, then, the gasket is essentially stiffer and runs the risk of being rolled under itself. If the skirt is omitted and the space is provided by enlarging the housing, the possibility of physically damaging the gasket exists.

This damage occurs when the gasket ends are butted during closure and the pipes deflect the gasket outwardly, and, at the same time the gasket bulges outwardly due to circumferential compression. The doubled effect forces the gasket into the space between the coupling segments, causing shearing and tearing of the gasket as the coupling is fully closed. If the space around the gasket end is increased to lessen the "pinching", sealing force on the pipe periphery is reduced.

The skirt on the gasket prevents the pinching by providing a compliant back up for the gasket. Even though the gasket is pushed radially outward during assembly, it never gets caught between the coupling segments. Because the gasket suffers no physical damage, the longer term, equilibrium configuration of the gasket is not compromised.

The greater width of the gasket pocket at the "equator" of the coupling generates a radial force which tends to increase the equatorial diameter. This partly counteracts the tendency to move inward due to the moments generated by pins or bolts located outboard of the gasket pocket. This maintains a more nearly circular shape which increases the capacity of the joint.

In summary, the skirt tends to maintain the geometric integrity of the gasket ends, allowing them to seal as they were intended to seal. The skirt provides compliant back-up and flexibility that reduce the tendency of the gasket ends rolling under and the risk of physical damage due to pinching. Prevention of improper installation of the gasket insures proper mating of the abutting gasket ends. Greater radial force tends to maintain circularity of the coupling.

DESCRIPTION OF THE DRAWINGS

The invention will now be described with reference to the accompanying drawings, which are illustrative of a preferred embodiment of the invention and in which:

FIG. 1 is a front elevation of a gasket segment of the present invention, shown positioned within a coupling segment and in juxtaposed relationship with another such coupling segment containing an identical gasket segment, one of the coupling segments being shown in cross-section;

FIG. 2 is an end elevation of the gasket segment illustrated in FIG. 1, when taken from either side of FIG. 1;

FIG. 3 is a plan view of the gasket segment;

FIG. 4 is an underside plan view of the gasket;

DESCRIPTION OF THE PREFERRED EMBODIMENT

Figure 5:
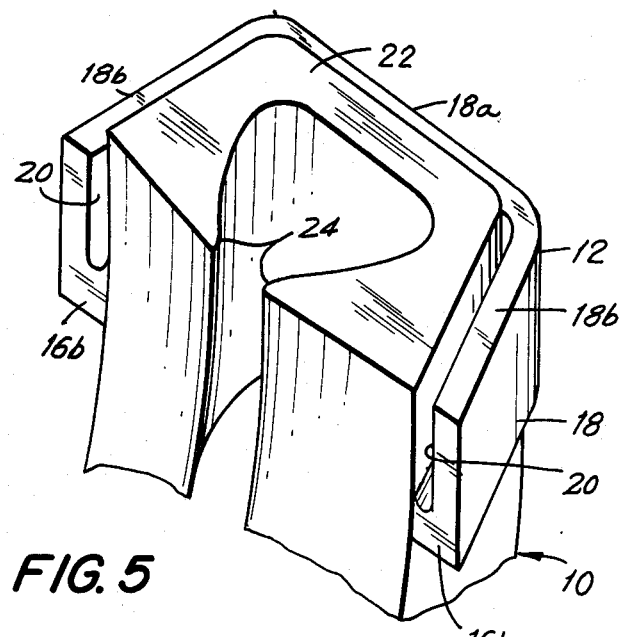
FIG. 5 is an enlarged perspective view of one end of the gasket prior to the compression thereof.

Referring firstly to FIGS. 1 through 5, the gasket 10, which may be formed from any suitable elastomer, is semi-arcuate in form, and terminates in opposite end portions 12, 14, each of which is entirely symmetrical with respect to the other, such that the gasket can be inserted into a coupling segment in either of two positions rotated 180° with respect to the other.

The respective end portions 12, each include a peripheral flange 16 that extends around outer sides of the gasket segment in order to provide a radially extending flange portion 16a, which merges at its opposite ends into generally axially extending flange portions 16b, 16b.

Extending towards the associated end of the gasket segment is a skirt 18 which is integral at one of its edges with the respective flange portions 16a and 16b, 16b.

The skirt portion 18 is contoured for it to lie at all positions substantially parallel to the outer surface of the gasket segment 10, thus defining a continuous channel 20 extending around the end of the gasket segment 10.

The end face of the gasket segment 10 extends to a position beyond the free edge of the skirt 18, the intention being that the free edge of the skirt 18 shall lie in the plane of a bolting face 28 provided on a bolting lug 29 of a coupling segment 26 to be used in conjunction with the gasket segment, and, as is later described with reference to FIG. 6. The coupling segment 26 in FIG. 1 is shown in the position it will occupy preparatory to assembly about the ends of pipes, such as the pipe P illustrated in FIG. 1, and, in a position in which it is ready to be secured to another coupling segment 26 by means of traction bolts (not shown).

The gasket segment 10 includes the usual mutually presented sealing lips 24 for engagement with the exterior periphery of adjacent ends of pipes (not shown) and in spanning relationship with the respective ends of the pipes.

Figure 6:
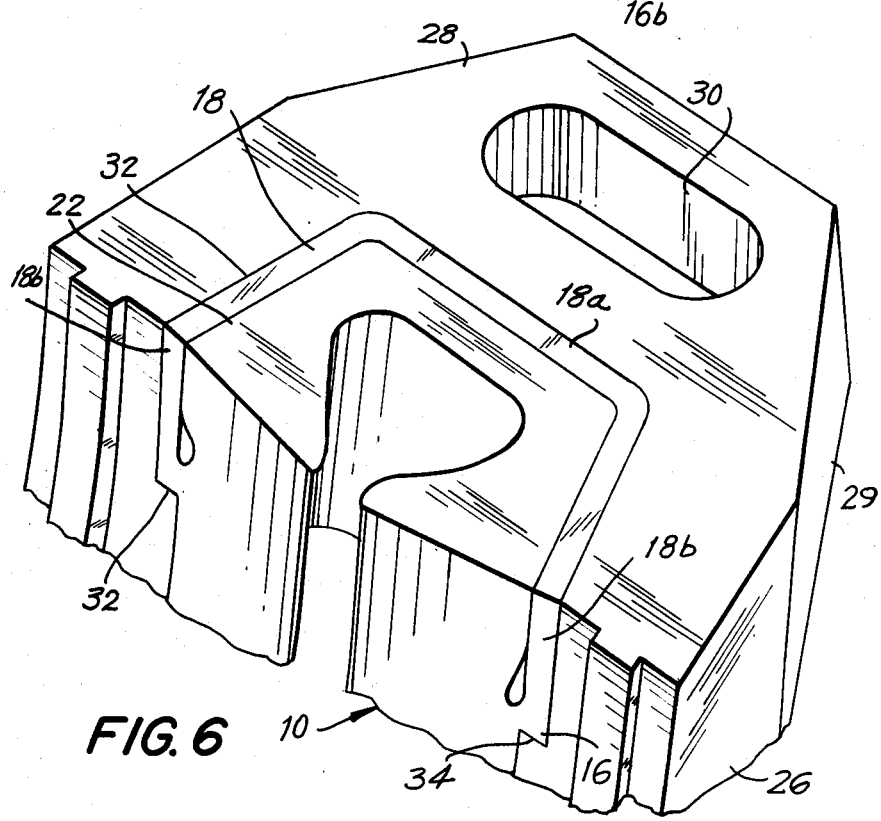
FIG. 6 is an enlarged perspective view of the same end as shown in FIG. 5, when in a condition in which the gasket segment has been compressed down to the plane of the associated bolting face of an associated coupling segment.

Referring now to FIG. 6, the gasket segment 10 is shown positioned within a coupling segment 26, the coupling segment having a substantially planar radially extending bolting face 28 provided on a bolting lug 29 having an aperture 30 for the reception of a track bolt (not shown).

Internally, the coupling segment is formed with a channel 32 for reception of the gasket segment 10, and, is provided with shoulders 34 providing reaction members for the flange 16 of the gasket segment. The channel 32 is appropriately formed internally for snug reception of the skirt portion 18 with the free edge portion of the skirt 18 lying substantially in the plane of the bolting face 28.

FIG. 6 shows the gasket segment in the condition it will assume after the tightening down of a pair of coupling segments onto undersized pipes, and in which the respective bolting faces 28 of a pair of respective coupling segments have been moved substantially into engagement with each other. Such a condition rarely will exist in practice, the more usual condition being that the respective bolting faces will lie substantially parallel to each other, and, be spaced from each other by a distance dependent on the actual dimensions of the pipes, whether they be oversized or undersized, or, exactly conforming to the standard size.

In tightening down of the coupling segments, the end face 22 of one gasket segment will engage and seat onto the corresponding end face of the next adjacent gasket segment, substantially in planar relationship therewith.

Upon continued tightening down of the respective coupling segments, a compressive force will be applied to the end face 22, acting in the illustration of FIG. 6 to force the free end of the gasket segment downwardly and cause it to retract into the skirt 18. In so doing, a compressive force will be developed in the ends of the respective gasket segments which is produced, more particularly, by the spring force stored in the elastometic material as it is forced downwardly into the confines of the skirt against the reaction members provided by the respective flanges 16.

This downward movement of the end of the gasket segment will result in outward bulging of the said end portion, which, can continue up to the point where the channel 20 is completely filled with the displaced elastomeric material of the said end portion.

Thus, without regard to the positioning of the bolting faces 28 within the range of manufacturing tolerances of the pipes, an entirely predictable compressive force is exerted at the end faces 22, and one which remains substantially constant without regard to expansion or contraction of the coupling segments.

It will be appreciated that various modifications may be made without departing from the scope of the appended claims.

It will be understood that the flange 16 and its engagement with the abutment shoulder 34 effectively inhibits the compressive forces exerted at the ends of the gasket segments from being transmitted into the body of the gasket segment and dissipated therein, such as would result in a loss in the compressive force exerted at the end faces 22.

While the end faces 22 preferably are positioned in a plane extending parallel to a plane extending through the axis of the coupling, the end faces can, if desired, be angled relative to the plane, provided, of course, that the resulting gasket remains entirely symmetrical, and, does not require a decision on the part of the workman as to the correct manner of inserting the gasket segments into the coupling segments.

While the invention has been described with reference to gasket segments for incorporation into coupling segments of pipe couplings, it will be understood that the invention also encompasses split gaskets, i.e. gaskets which completely encircle the pipes to be sealed and which have opposite ends that are brought into sealing face engagement with each other upon tightening down of the coupling segments, the respective ends each having the formation above described. Such split gaskets find particular application for use in conjunction with segmented couplings for pipes in which the respective coupling segments are hinged to each other at one or both of the ends, and which are provided with a single pair of bolting pads or other securement means.

I claim:

1. A symmetrical elastomeric gasket segment for a segmented pipe coupling, comprising:
    a said gasket segment formed from an elastomeric material and having a circumferential length greater than that of the coupling segment with which it is to be employed;

a flange providing a reaction member adjacent each end of said gasket segment and extending outwardly therefrom for engagement with a corresponding shoulder of a said coupling segment;

a skirt portion integral with said flange and extending spaced from the adjacent end of said gasket segment to define an open channel;

the ends of said gasket segment being retractable and displaceable into the associated said skirt portions under compressive loading of the associated end face of said gasket segment against the reaction provided by said flange;

the extent of compressive loading at said end faces being determined by the spring forces stored in said end portions upon the retraction and displacement thereof.

2. The elastomeric gasket segment of claim 1, in which said skirt extends towards the associated end of the gasket.

3. The elastomeric gasket segment of claim 1, in which said flange is operative to restrict compressive loading of said gasket segment in the circumferential direction to the adjacent end of said gasket segment.

4. The elastomeric gasket segment of claim 1, in which the volume of said open ended channel is greater than the maximum expected volumetric displacement of said end portion.

5. A segmented pipe coupling incorporating plural coupling segments for positioning around the ends of pipes in encircling relation therewith, and a corresponding number of gasket segments, each coupling segment having an internal channel for the reception of a said gasket segment and each providing an internal shoulder adjacent each end thereof, further including:

each said gasket segment being formed from an elastomeric material and having a circumferential length greater than that of the internal channel of the associated coupling segment;

a flange providing a reaction member adjacent each end of each said gasket segment, each said flange extending outwardly from the associated gasket segment and into engagement with a said internal shoulder of the associated coupling segment;

a skirt integral with each said flange and extending spaced from the adjacent end of the associated gasket segment to define an open channel;

the end of each said gasket segment being retractable and displaceable into the associated said skirt under compressive loading of the associated end face of said gasket segment against the reaction member provided by said flange;

the extent of compressive loading of said end faces being determined by the spring force stored in said end portions upon the retraction and displacement thereof.

6. The segmented pipe coupling of claim 5, in which each said skirt extends towards the associated end of each said gasket segment.

7. The segmented pipe coupling of claim 5, in which each said flange is operative to restrict compressive loading of each said gasket segment in the circumferential direction to the ends of each said gasket segment adjacent the respective flanges.

8. The segmented pipe coupling of claim 5, in which the volume of said channel is greater than the maximum expected volumetric displacement of said end portions.

* * * * *